(12) United States Patent
Stillwell, Jr. et al.

(10) Patent No.: US 7,290,114 B2
(45) Date of Patent: Oct. 30, 2007

(54) SHARING DATA IN A USER VIRTUAL ADDRESS RANGE WITH A KERNEL VIRTUAL ADDRESS RANGE

(75) Inventors: Paul M. Stillwell, Jr., Aloha, OR (US); Vikram A. Saletore, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 415 days.

(21) Appl. No.: 10/991,717

(22) Filed: Nov. 17, 2004

(65) Prior Publication Data

US 2006/0107020 A1 May 18, 2006

(51) Int. Cl.
*G06F 12/00* (2006.01)
(52) U.S. Cl. ...................... 711/203; 711/209
(58) Field of Classification Search ...................... None
See application file for complete search history.

(56) References Cited

U.S. PATENT DOCUMENTS 7,100,014 B2 \* 8/2006 Ruemmler et al. ......... 711/170

\* cited by examiner

*Primary Examiner*—Kevin Verbrugge
(74) *Attorney, Agent, or Firm*—Konrad Raynes & Victor LLP

(57) ABSTRACT

Provided are a method, system, and program for sharing data in a user virtual address range with a kernel virtual address range. A user address in a user address space and length defining a user address range referencing physical locations in a memory are received. A determination is made of determining at least one page in the memory including the physical locations referenced by the user address range. For each determined page, one kernel address in a kernel address space is generated to reference the determined page, wherein at least one user address and at least one kernel address reference one page in the memory.

39 Claims, 6 Drawing Sheets

Kernel Handle

Page Metadata

Page to Kernel Address Mapping

US 7,290,114 B2

SHARING DATA IN A USER VIRTUAL ADDRESS RANGE WITH A KERNEL VIRTUAL ADDRESS RANGE

BACKGROUND

When a user application executing in a user space wants to invoke a process in the kernel space with respect to data maintained at a virtual address in the user space, the operating system will intervene and perform a context switch and copy data from the user virtual addresses to kernel virtual addresses to make available to the kernel process being invoked. In this way, a range of user virtual addresses are mapped to contiguous kernel virtual addresses so that the user data may be provided to the kernel process. For instance, an application in the user space may initially issue an IOCTL call to a driver executing in the kernel space to register the user virtual address range that will be subjected to subsequent driver calls. The operating system intercepts the IOCTL registration request and performs a context switch to copy data from the specified user virtual addresses to kernel virtual addresses in the kernel space. During subsequent driver calls from the application, the driver in the kernel space accesses and processes the data using the assigned kernel virtual addresses.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
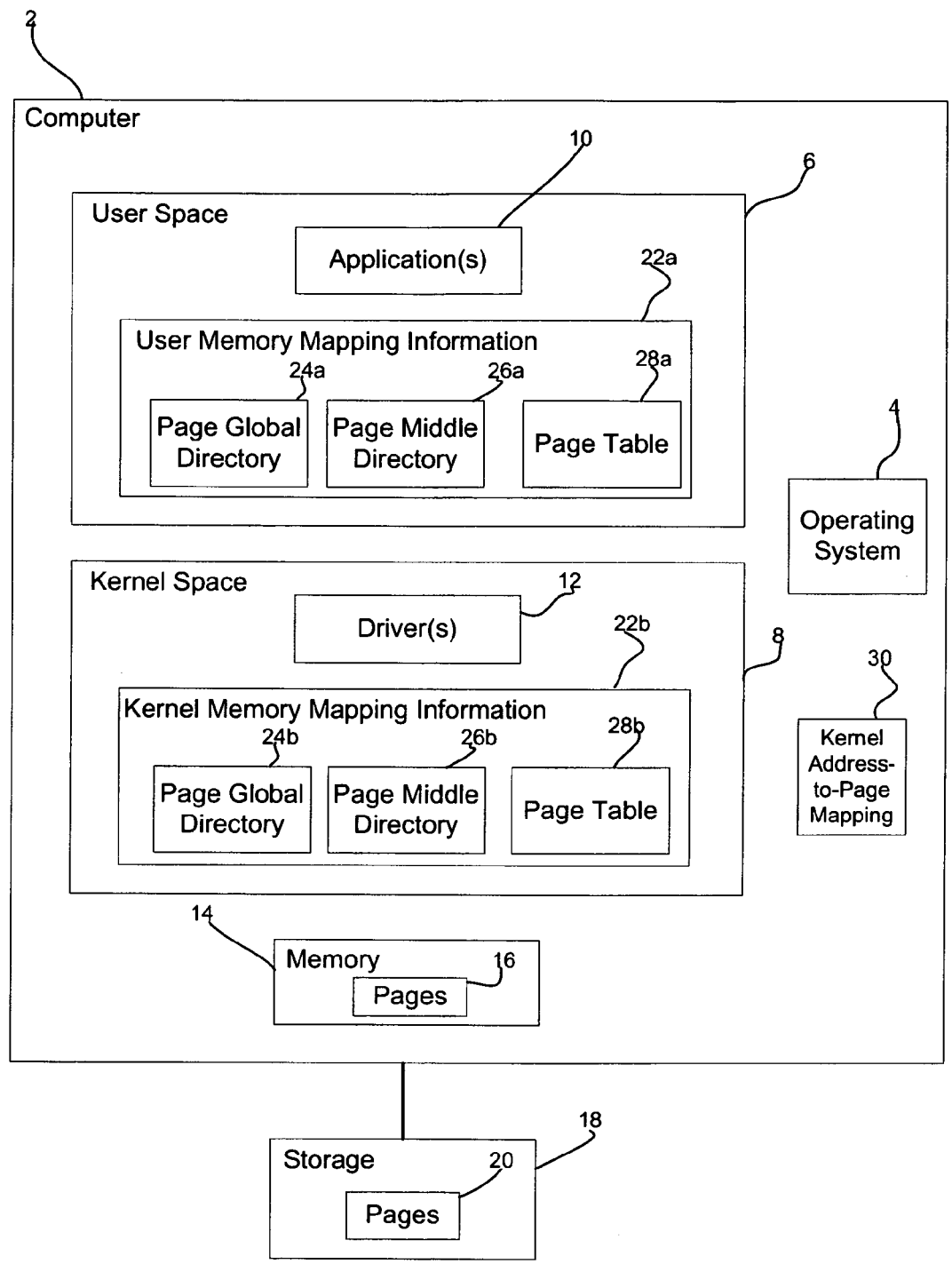
FIG. 1 illustrates a computing environment.

FIG. 1 illustrates a computer system 2 having an operating system 4, such as Windows®, a registered trademark of Microsoft Corporation, Linux®, a registered trademark of Linus Torvalds, a Unix® based operating system, a registered trademark of The Open Group, or other operating systems known in the art. The operating system 4 executes programs in a user space 6 or kernel space 8, where processes and threads executing in the kernel space 8 are assigned a higher priority to computational resources than those executing in the user space 6. FIG. 1 shows applications 10 executing in the user space 6 and device drivers 12 executing in the kernel space 8. Applications other than drivers may also execute in the kernel space 8.

The computer system 2 includes or is coupled to a memory 14, which may comprise a volatile memory device known in the art, such as a Static Random Access Memory (SRAM), Dynamic Random Access Memory (DRAM), etc. or an on-board cache. The operating system 4 includes a memory management module that organizes the physical data in memory 14 in pages 16. The operating system 4 memory management assigns virtual addresses allocated to the applications/drivers to pages 16 and 20 in memory 14 and storage 18, respectively. The storage 18 may comprise a non-volatile storage device, such as a hard disk drive, or lower level memory device with respect to the memory 14. In this way, the operating system 4 may assign virtual addresses to memory locations exceeding the size of the memory 14 by assigning the virtual addresses to pages that may be in memory 14 or storage 18. Pages 20 may be swapped from the storage 18 to the memory 14 when accessed and pages 16 in memory 14 may be swapped to the storage 18 using memory management techniques known in the art.

The operating system 4 may assign virtual addresses for the user space 6 or kernel space 8, where virtual addresses assigned to the user space 6 comprises user addresses and virtual addresses assigned to the kernel space 8 comprise kernel addresses. A virtual address comprises a memory address, such as a 32 or 64 bit address that references data that may be located in physical pages 16 or 20 in the memory 14 or storage 18, respectively.

The operating system 4 maintains user 22a and kernel 22b memory mapping information to map virtual addresses to specific pages 16 or 20, which may be in the memory 14 or storage 18, respectively. In certain embodiments, the kernel addresses reference pages 16 maintained in the memory 14, and pages referenced by kernel addresses are not swapped to the storage 18. The memory mapping information 22a, 22b includes a page global directory 24a, 24b, where each entry references one page middle directory 26a, 26b having entries that reference one page table 28a, 28b. Each entry in the page table 28a, 28b references one page 16, 20. There may be one page global directory 24a, 24b, one or more page middle directories 26a, 26ba, and multiple page tables 28a, 28b. In 32 bit architecture, there may be just one page middle directory and in 64 bit architecture there may be multiple page middle directories. The operating system 4 further maintains a kernel address-to-page mapping 30 indicating kernel addresses assigned to physical pages 16 in the memory 14.

Figure 2:
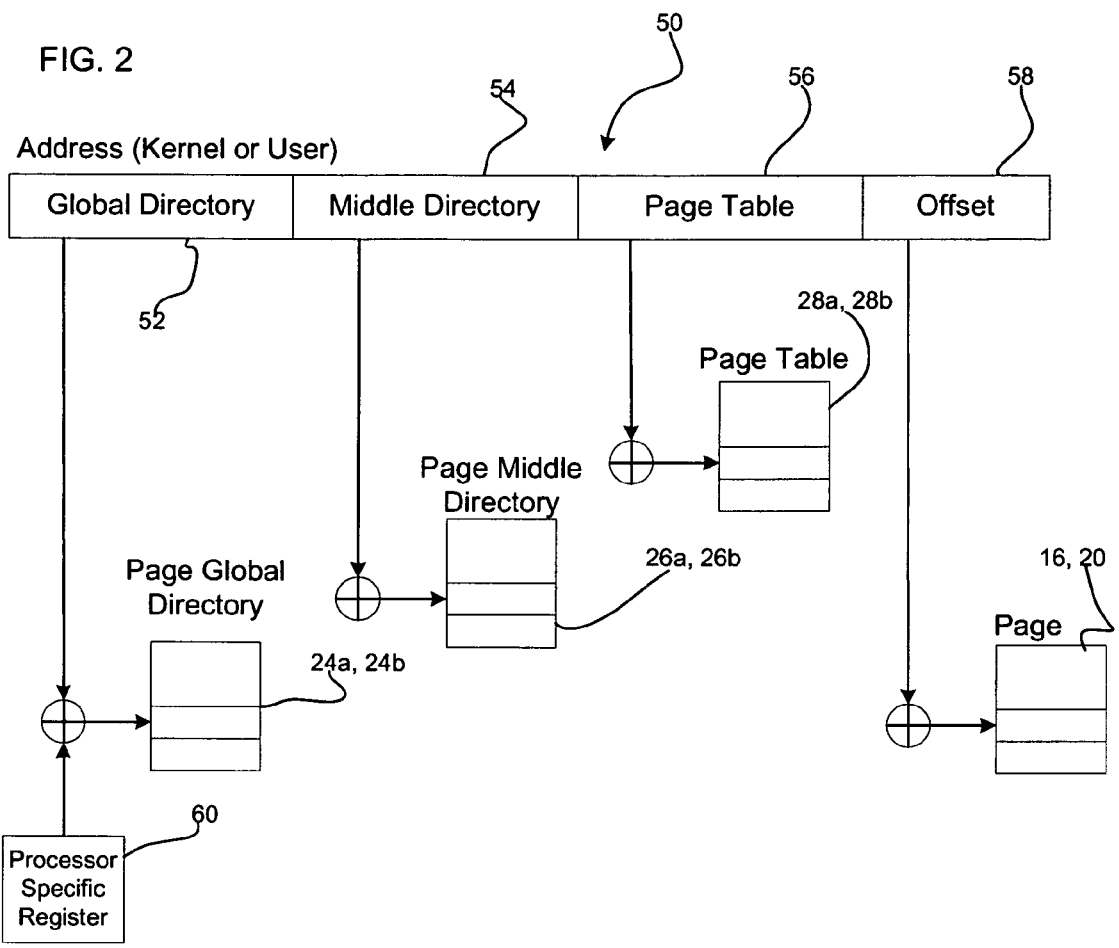
FIG. 2 illustrates an association of a user or kernel (virtual) address to memory management information.

FIG. 2 illustrates how bits in a kernel or user address 50 reference entries in the memory mapping tables 24a, 24b, 26a, 26b, 28a, 28b, i.e., provide an index to the mapping tables. Global directory bits 52 in the address 50 reference an entry in the page global directory table 24a, 24b; middle directory bits 54 reference an entry in the page middle directory 26a, 26b; page table bits 56 reference an entry in the page table 28a, 28b; and offset bits 58 provide an offset into the page 16 or 20 referenced in the page table entry 28a, 28b of the data referenced by the address 50. In certain embodiments, such as with 32 bit addresses, the page middle directory 26a, 26b may only comprise one value, i.e., have only one entry, or there may be no page middle directory 26a, 26b. If there is no page middle directory 26a, 26b, then the entry in the page global directory 24a, 24b references one page table 28a, 28b entry. In certain embodiments, such as addresses having 64 bits, a page middle directory 26a, 26b may be used. Alternatively, there may be yet additional page directories to accommodate additional possible virtual addresses 50. A processor specific register 60 describes the valid memory for any given process, and is the register saved each time a context switch is done and restored when the process is reloaded.

Figure 3:
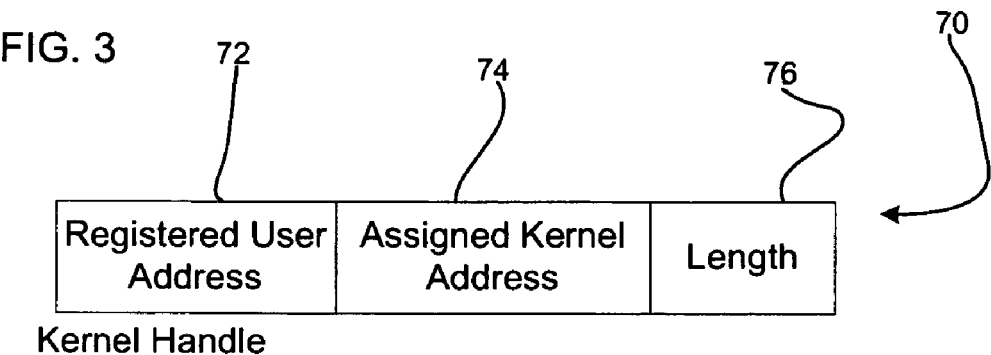
FIG. 3 illustrates a kernel handle.

FIG. 3 illustrates an example of a kernel handle 70 the operating system 4 returns to an application 10 in the user space 6 requesting to register a user address in the kernel address space. The kernel handle 70 indicates a registered user address 72 in the user space 6 the application 10 registered; an assigned kernel address 74 in the kernel space 8 assigned to the first page referenced by the registered user address and a length 76 of the referenced user address range. In this way, a range of user addresses is shared with the kernel space by allocating a range of kernel addresses to the pages including the user addresses. The application 10 executing in the user space 6 uses the returned kernel handle 70 when calling a driver 12 to perform Input/Operations (I/O) in the kernel space 8 with respect to the data buffer referenced by the kernel handle 70.

Figure 4:
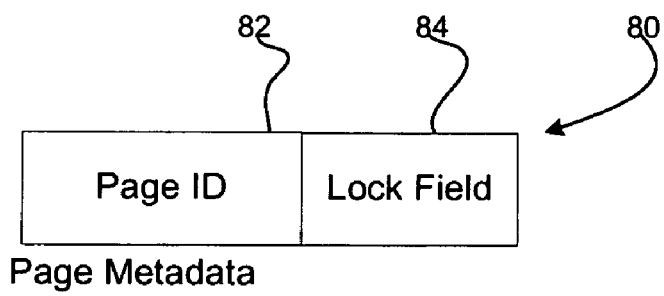
FIG. 4 illustrates page metadata maintained for pages in memory or other storage.

FIG. 4 illustrates page metadata 80 maintained for each page, including a page identifier 82 identifying a page of physical data that may be located in the memory 14 or storage 18 and a lock field 84 indicating whether the page is locked. A locked page cannot be swapped out of memory 14 to the storage 18. If the page is locked, then the page is maintained in the memory 14. When the operating system 4 assigns a kernel address to a page referenced by the registered user address, the page is locked so that the page will not be swapped out of memory 14 to storage 18 while being referenced by a kernel address.

Figure 5:
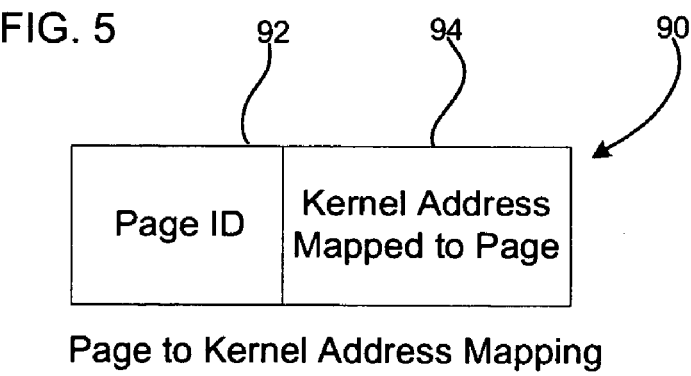
FIG. 5 illustrates a kernel address-to-page mapping.

FIG. 5 illustrates an entry 90 in the kernel address-to-page mapping 30 that is generated when assigning a kernel address to a page referenced by a user address in the user address range being registered. The entry 90 includes a page identifier 92 identifying a page 16 of physical data in the memory 14 and a kernel address 94 assigned to the identified page. This mapping 90 is used to ensure that applications 10 attempting to register different user addresses referencing the same physical page are assigned the same kernel address to prevent duplicate kernel addresses from referencing the same physical page 16 or 20. This conserves kernel addresses by assigning and using only one kernel address to reference a page across user applications 10 in the user space 6.

Figure 6:
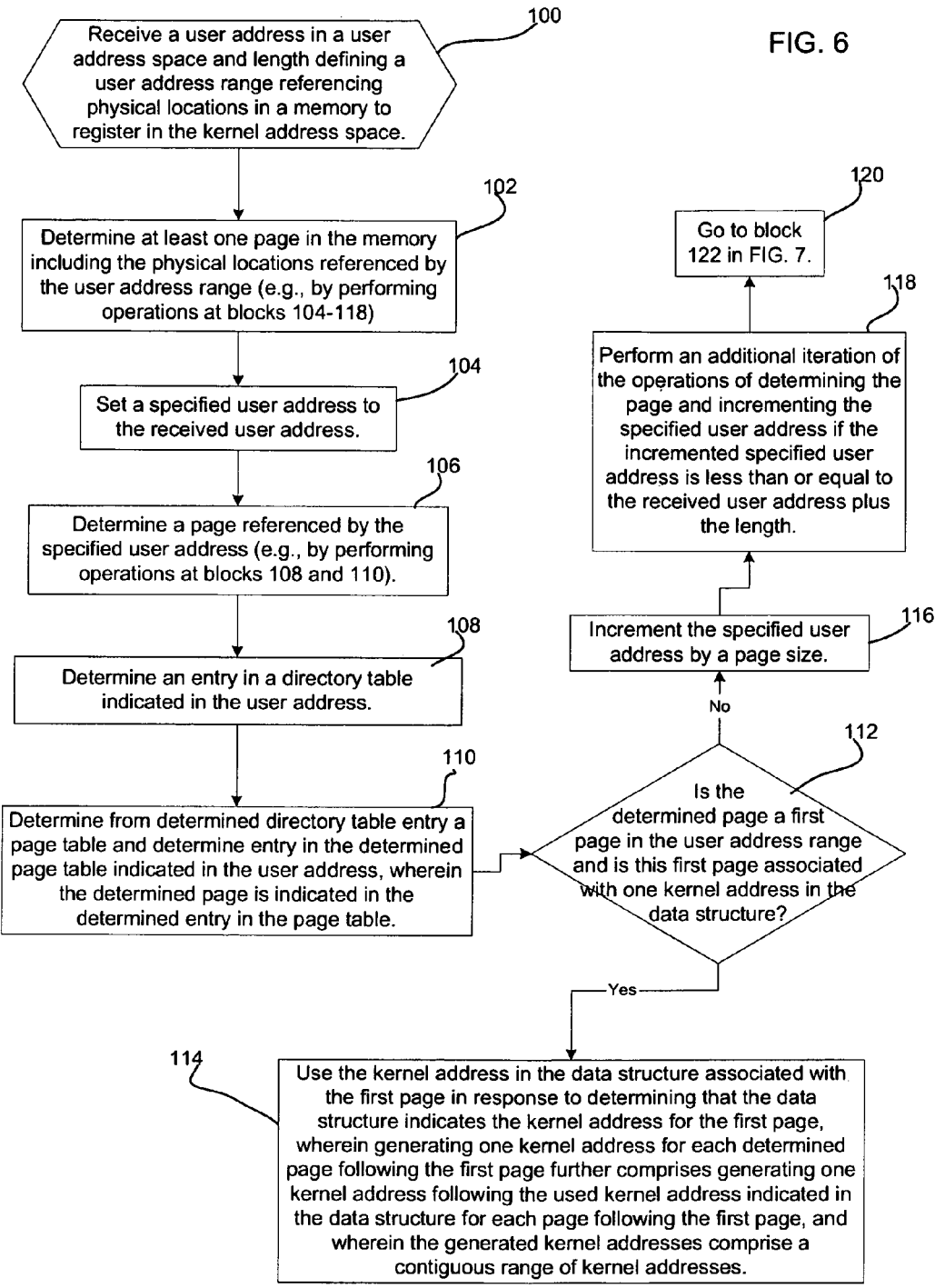
FIGS. 6, 7, and 8 illustrates operations to have user and kernel addresses share a same physical page of data.
Figure 7:
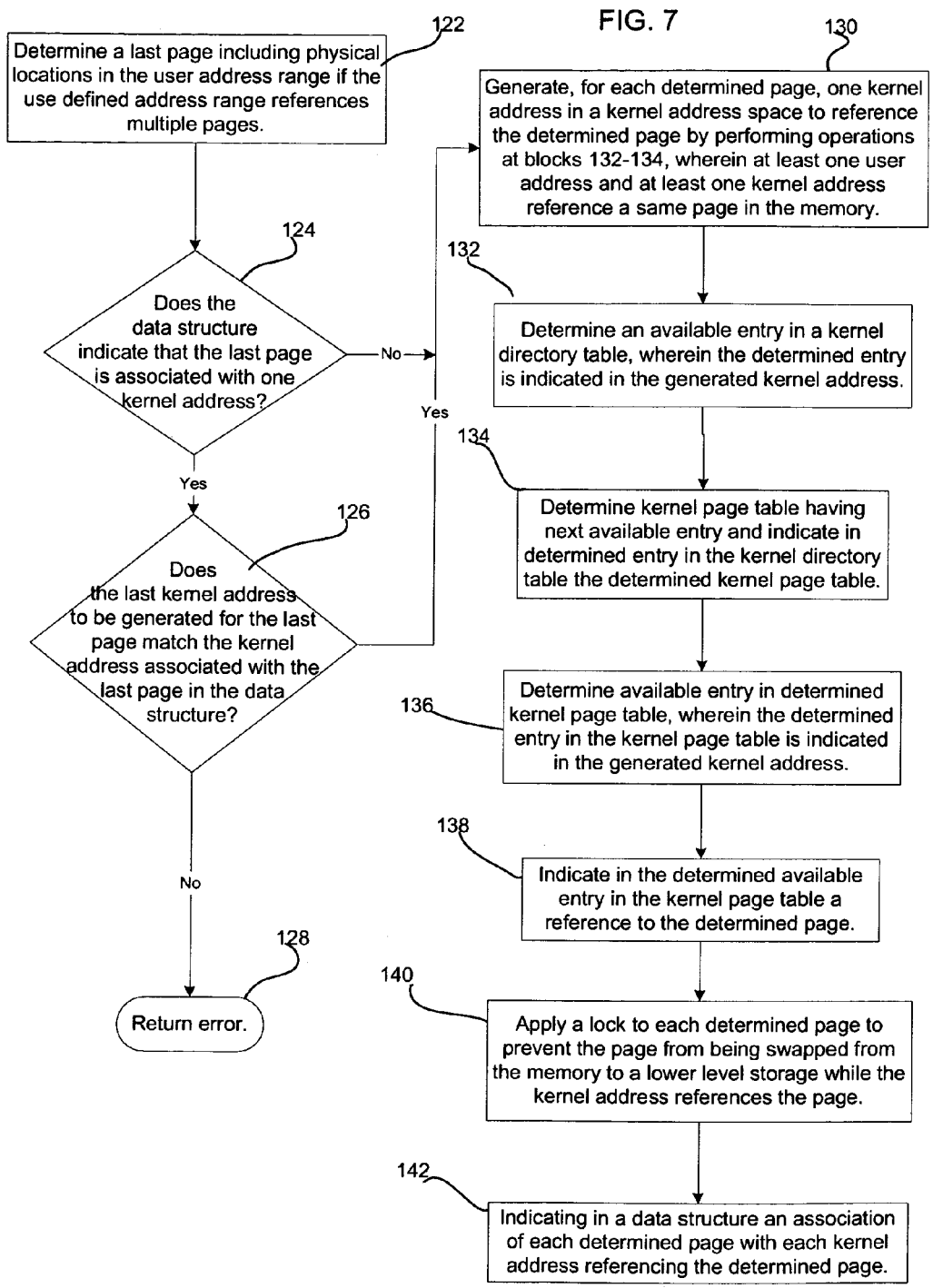

FIGS. 6 and 7 illustrate operations performed to assign kernel addresses to user addresses being registered by an application in a user space 6. FIGS. 6 and 7 illustrate operations the operating system 4 performs to generate a kernel address in response to a request to register a user address range defined by a start user address and length. The operating system 4 (or other kernel process) receives (at block 100) a user address and length defining a user address range referencing physical locations in a memory 14 to register in the kernel address space 8. The application 10 in the user space 6 may register a user address range to make user data available to the kernel address space 8 accessed by a kernel application, such as a driver 12. The user application 10 calls the driver 12 to invoke operations in the kernel space 8 with respect to the registered user address range. In certain embodiments, the application 10 may use an IOCTL to call the driver 12 to register the user address range that is intercepted by the operating system 4. The operating system 4 intercepts the IOCTL and then performs the operations to assign kernel addresses to the registered user address range and return the kernel handle 70 to the application 10 to use in subsequent calls to the driver 12 with respect to the registered user address range. Alternatively, certain of the operations described with respect to FIGS. 6 and 7 may be performed by the driver 12.

In response to the request to register the user address range, the operating system 4 determines (at block 102) at least one page 16 or 20 in the memory 14 or storage 18 including the physical locations referenced by the user address range. This determination of the pages may be made by performing operations at blocks 104 through 118. At block 104, a specified user address is set to the received user address, or first address in the user address range being registered, and a determination is made (at block 106) of a page 16 or 20 referenced by the specified user address. The page referenced by the specified user address may be determined by performing the operations at blocks 108 and 110. At block 108, the operating system 4 (or driver 12) determines an entry in a directory table, e.g., page global directory 24a, indicated in the user address, e.g., global directory bits 52. The operating system 4 (or driver 12) then determines (at block 110) from the determined directory table entry a page table, e.g., 28a, and determines the entry in the determined page table indicated in the user address, e.g., in the page table bits 56, wherein the determined page is indicated in the determined entry in the page table. In embodiments including a page middle directory 26a, the determined entry in the page global directory 24a may identify a page middle directory 26a (in 32 bit addressing there may be only one page middle directory and in 64 bit operating systems there may be multiple page middle directories). The middle directory 54 bits in the address 50 may identify an entry in the determined page middle directory, where the determined entry identifies the page table that references the page associated with the address. In this way, when determining the physical page associated with a user address, the operating system 4 (or driver 12) walks the user page table from the page global directory 24a, to any page middle directory 26a, and then to the page table 28a.

After determining one page, the operating system 4 determines (at block 112) whether the determined page is a first page and, if so, whether the first page in the user address range is associated with one previously assigned kernel address indicated in the data structure, i.e., the kernel address-to-page mapping 30. The first page comprises the page referenced by the first user address in the user address range, i.e., the user address presented to register. If (at block 112) the first page is indicated in the data structure, e.g., 30, as having an assigned kernel address, then the kernel address in the data structure, e.g., 30, associated with the first page is used for the first page (at block 114). In such case, generating one kernel address for each determined page following the first page comprises generating one kernel address following the used kernel address indicated in the data structure, e.g., 30, for each page following the first page. This results in a contiguous range of kernel addresses corresponding to the user addresses defining the user address range. Further, checking with the data structure, e.g., 30, conserves kernel addresses by returning the kernel address already assigned to a determined page instead of allocating an additional kernel address to reference the page 16.

If (at block 112) the determined page is not the first page or the first page is not indicated in the data structure, i.e., there is not an active kernel address currently assigned to the first page, then the operating system 4 increments (at block 116) the specified user address by a page size to determine a next page in the user address range. The operating system 4 performs (at block 118) an additional iteration of the operations of determining the page (at block 106) and incrementing the specified user address (at block 116) if the incremented specified user address is less than or equal to the received user address plus the length, i.e., within the user address range. In this way, the operating system 4 determines each page including physical locations addressed by the user address range. If a determined page 20 is in the storage 18, then the operating system 4 swaps the determined page 20 into memory 14 because the page will be assigned a kernel address and kernel addressed pages are maintained in memory 14 and not swapped to storage 18.

After performing any additional iterations at block 118, control proceeds (at block 120) to block 122 in FIG. 7 to determine a last page including physical locations in the user address range if the user defined address range references multiple pages. If (at block 124) the data structure, e.g., 30, indicates that the last page is associated with one kernel address, then a determination is made (at block 126) whether the last kernel address to be generated for the last page matches the kernel address associated with the last page in the data structure, e.g., 30. The last kernel address to be generated may be determined by adding the length of the user defined address range to the kernel address that will be assigned to the first page. Further, the match may occur with respect to those portions of the address that reference the page, including the global directory bits 52, middle directory bits 54 (if any), and page table bits 56. If (block 126) the last kernel address to be generated for the last page does not match the kernel address associated with the last page in the data structure, e.g., 30, then an error is returned (at block 128) because otherwise two different kernel addresses references the same page.

If (at block 124) the last page is not associated with one kernel address in the data structure, e.g., 30, or if (at block 126) last kernel address to be generated for the last page matches the kernel address associated with the last page in the data structure, e.g., 30, then the operating system 4 generates (at block 130), for each determined page, one kernel address in a kernel address space to reference the determined page. In such case, at least one user address and at least one kernel address reference a same page in the memory.

The kernel addresses may be generated by performing the operations at blocks 132 and 138. At block 132, the operating system 4 determines an available entry in a kernel directory table, e.g., kernel page global directory 24b, wherein the determined entry is indicated in the generated kernel address, e.g., at the kernel global directory bits 52. The operating system 4 determines (at block 134) a kernel page table, e.g., 28b, having a next available entry and indicates in the determined entry in the kernel directory table, e.g., 24b, the determined kernel page table. A determination is further made (at block 136) of an available entry in the determined kernel page table, e.g., 28b, wherein the determined entry in the kernel page table is indicated in the generated kernel address, e.g., at the page table bits 56. The operating system 4 (or driver 12) indicates (at block 138) in the determined available entry in the kernel page table, e.g., 28b, a reference to the determined page. Thus, kernel addresses are assigned so that one user address and one kernel address reference a same page in the memory by performing the operations at blocks 134 and 136. If there is a page middle directory 26b, then the page global directory 24b entry references the page middle directory 26b and the middle directory bits 54 references an entry in the referenced page middle directory 26b that indicates the page table 28b including the entry identified in the page table bits 56 that identifies the page.

The operating system 4 applies (at block 140) a lock to each determined page to prevent the page from being swapped from the memory to a lower level storage, e.g., storage 18, while the kernel address references the page 16. Thus, in the event a user application 10 in the user space deallocates a user address, the corresponding page is not swapped out if there is a kernel address assigned to that page to ensure that all pages referenced by kernel address are maintained in the memory 14. The lock may be applied by setting the lock field 84 in the page metadata 80 (FIG. 3) for the determined page. The operating system 4 further indicates (at block 138) in a data structure, e.g., the kernel address-to-page mapping 30, an association of each determined page with each kernel address referencing the determined page. In this way the kernel memory mapping information 22b is updated to address the page tables including data for the user address range being registered.

Figure 8:
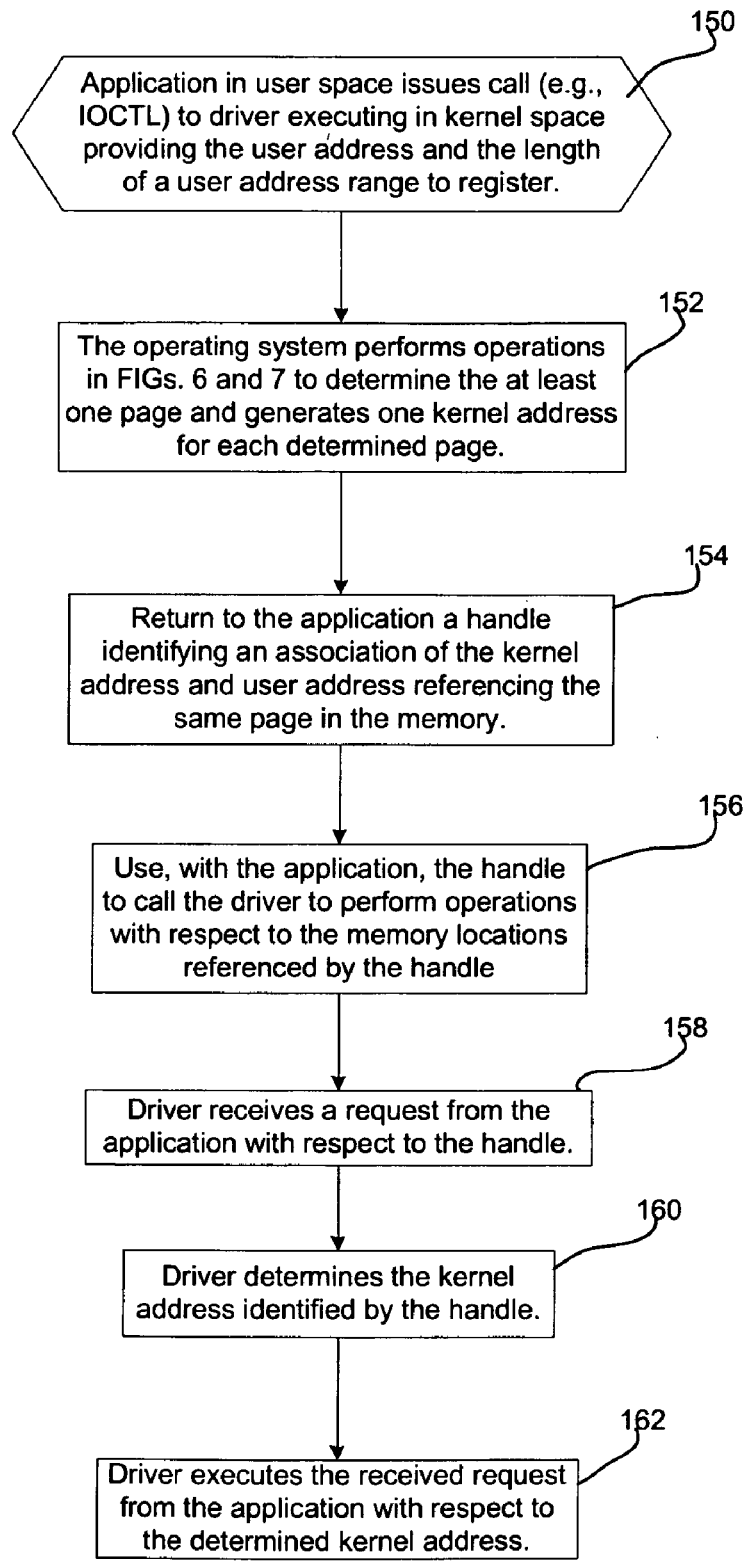

FIG. 8 illustrates an additional example of how the application 10, driver 12, and operating system 4 utilize the kernel address allocation techniques of FIGS. 6 and 7. Control begins at block 150 when an application issues a call to a driver 12 executing in the kernel space 8 providing a user address range to register, i.e., the received address and the length of the range. The call may comprise an IOCTL to register the user address range. The operating system 4 intercepts the registration call to the driver 12 and performs the operations in FIGS. 6 and 7 (at block 152) to determine the at least one page and generate one kernel address for each determined page. The operating system 4 returns (at block 154) to the application a handle, e.g., kernel handle 70, identifying an association of the kernel address and user address referencing the same page in the memory. The kernel handle 70 may indicate the registered first user address 72, the assigned kernel address, and the length of the user address range being registered.

The application 10 may use (at block 156) the handle, e.g., 70, to call the driver 12 to perform operations in the kernel space 8 with respect to the memory locations referenced by the handle, e.g., 70, i.e., the user address range. The driver 12 receives (at block 158) a request from the application 10 with respect to the handle and determines (at block 160) the kernel address identified by the handle, which may be included in field 74 of the handle 70 (FIG. 3). The driver 12 further executes (at block 162) the received request from the application with respect to the determined kernel address. If the application 10 request is to deregister the handle, then the driver 12 executes the received request by releasing the kernel address indicated by the handle. In certain embodiments, if different user addresses are assigned the same kernel address, then the kernel address may not be released until all applications have deregistered their handles referencing the kernel address. Deregistering the kernel address may comprise removing the entry 90 in the kernel address-to-page mapping for the page associated with the deregistered kernel address 94.

With the described embodiments a kernel address is assigned to reference a same memory location as the registered user address to avoid having to copy data between different memory locations and between the user and kernel spaces. Further, with the described embodiments, a context switch may not be needed when the user process uses the registered memory.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In the described embodiments, the application in the user space calls a driver to register the user address range to initiate driver operations in the kernel space. In additional implementations, the application may invoke applications other than drivers in the kernel space to register user data in the kernel address space and perform kernel related operations.

The illustrated operations of FIGS. 6, 7, and 8 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method comprising:
   receiving a user address in a user address space and length defining a user address range referencing physical locations in a memory;
   determining at least one page in the memory including the physical locations referenced by the user address range; and
   generating, for each determined page, one kernel address in a kernel address space to reference the determined page, wherein at least one user address and at least one kernel address reference one page in the memory.

2. The method of claim 1, wherein determining the at least one page further comprises:
   setting a specified user address to the received user address;
   determining a page referenced by the specified user address;
   incrementing the specified user address by a page size; and
   performing an additional iteration of the operations of determining the page and incrementing the specified user address if the incremented specified user address is less than or equal to the received user address plus the length.

3. The method of claim 2, wherein determining the page referenced by the specified address comprises:
   determining an entry in a page table indicated in the user address, wherein the determined page is indicated in the determined entry in the page table.

4. The method of claim 3, wherein determining the entry in the page table comprises:
   determining an entry in a directory table indicated in the user address, wherein the determined entry in the directory table references the page table.

5. The method of claim 1, wherein generating the kernel address for one determined page further comprises:
   indicating in an available entry in a kernel page table a reference to the determined page, wherein the entry in the kernel page table is indicated in the generated kernel address.

6. The method of claim 5, wherein generating the kernel address for one determined page further comprises:
   indicating in an available entry in a kernel directory table a reference to the kernel page table including the reference to the determined page, wherein the entry in the kernel directory table is indicated in the generated kernel address.

7. The method of claim 1, farther comprising:
   applying a lock to each determined page to prevent the page from being swapped from the memory to a lower level storage while the kernel address references the page.

8. The method of claim 1, wherein a driver executing in kernel space receives the user address and the length from an application executing in user space, wherein the driver determines the at least one page and generates one kernel address for each determined page and farther performs:
   returning to the application a handle identifying an association of the kernel address and user address referencing the page in the memory; and
   using, with the application, the handle to call the driver to perform operations with respect to the memory locations referenced by the handle.

9. The method of claim 8, wherein the driver further performs:
   receiving a request from the application with respect to the handle;
   determining the kernel address identified by the handle; and
   executing the received request from the application with respect to the determined kernel address.

10. The method of claim 9, wherein the request comprises a request to deregister the handle, wherein executing the received request comprises:
    releasing the kernel address indicated by the handle.

11. The method of claim 1, further comprising:
    indicating in a data structure an association of each determined page with each kernel address referencing the determined page;

determining whether a first page in the user address range is associated with one kernel address in the data structure; and using the kernel address in the data structure associated with the first page in response to determining that the data structure indicates the kernel address for the first page, wherein generating one kernel address for each determined page following the first page further comprises generating one kernel address following the used kernel address indicated in the data structure for each page following the first page, and wherein the generated kernel addresses comprise a contiguous range of kernel addresses.

12. The method of claim 1, further comprising:
indicating in a data structure an association of each determined page with each kernel address referencing the determined page;
determining whether a first page in the user address range is associated with one kernel address in the data structure;
determining a last page in the user address range in response to determining that the first page is not associated with one kernel address in the data structure and in response to their being multiple pages referenced by the user address range;
determining whether a last kernel address to be generated for the last page matches the kernel address associated with the last page in the data structure in response to determining that the last page is associated with one kernel address in the data structure; and
returning an error in response to determining the last kernel address to be generated does not match the kernel address associated with the last page in the data structure.

13. The method of claim 12, wherein the kernel addresses are generated in response to determining that the last kernel address to be generated matches the kernel address associated with the last page in the data structure.

14. A system, comprising:
a memory having a kernel address space and a user address space;
a processor in communication with the memory;
a computer readable storage medium having code executed by the processor to perform operations, the operations comprising:
(i) receiving a user address in the user address space and length defining a user address range referencing physical locations in the memory;
(ii) determining at least one page in the memory including the physical locations referenced by the user address range; and
(iii) generating, for each determined page, one kernel address in the kernel address space to reference the determined page, wherein at least one user address and at least one kernel address reference a one page in the memory.

15. The system of claim 14, wherein determining the at least one page further comprises:
setting a specified user address to the received user address;
determining a page referenced by the specified user address;
incrementing the specified user address by a page size; and
performing an additional iteration of the operations of determining the page and incrementing the specified user address if the incremented specified user address is less than or equal to the received user address plus the length.

16. The system of claim 15, wherein determining the page referenced by the specified address comprises:
determining an entry in a page table indicated in the user address, wherein the determined page is indicated in the determined entry in the page table.

17. The system of claim 16, wherein determining the entry in the page table comprises:
determining an entry in a directory table indicated in the user address, wherein the determined entry in the directory table references the page table.

18. The system of claim 14, wherein generating the kernel address for one determined page further comprises:
indicating in an available entry in a kernel page table a reference to the determined page, wherein the entry in the kernel page table is indicated in the generated kernel address.

19. The system of claim 18, wherein generating the kernel address for one determined page further comprises:
indicating in an available entry in a kernel directory table a reference to the kernel page table including the reference to the determined page, wherein the entry in the kernel directory table is indicated in the generated kernel address.

20. The system of claim 14, wherein the operations performed by the processor further comprise:
applying a lock to each determined page to prevent the page from being swapped from the memory to a lower level storage while the kernel address references the page.

21. The system of claim 14, wherein the operations performed by the processor further comprising:
maintaining a kernel space and user space;
an application the processor executes in the user space;
a driver the processor executes in the kernel space, wherein the driver receives the user address and the length from the application, and wherein the driver determines the at least one page and generates one kernel address for each determined page and further performs:
(i) returning to the application a handle identifying an association of the kernel address and user address referencing the page in the memory, wherein the application uses the handle to call the driver to perform operations with respect to the memory locations referenced by the handle.

22. The system of claim 21, wherein the driver executed by the processor further performs:
receiving a request from the application with respect to the handle;
determining the kernel address identified by the handle; and
executing the received request from the application with respect to the determined kernel address.

23. The system of claim 22, wherein the request comprises a request to deregister the handle, wherein executing the received request comprises:
releasing the kernel address indicated by the handle.

24. The system of claim 14, wherein the operations performed by the processor further comprise:
indicating in a data structure in the memory an association of each determined page with each kernel address referencing the determined page;

determining whether a first page in the user address range is associated with one kernel address in the data structure; and using the kernel address in the data structure associated with the first page in response to determining that the data structure indicates the kernel address for the first page, wherein generating one kernel address for each determined page following the first page further comprises generating one kernel address following the used kernel address indicated in the data structure for each page following the first page, and wherein the generated kernel addresses comprise a contiguous range of kernel addresses.

25. The system of claim 14, wherein the operations performed by the processor further comprise:

indicating in a data structure in the memory an association of each determined page with each kernel address referencing the determined page;

determining whether a first page in the user address range is associated with one kernel address in the data structure;

determining a last page in the user address range in response to determining that the first page is not associated with one kernel address in the data structure and in response to their being multiple pages referenced by the user address range;

determining whether a last kernel address to be generated for the last page matches the kernel address associated with the last page in the data structure in response to determining that the last page is associated with one kernel address in the data structure; and returning an error in response to determining the last kernel address to be generated does not match the kernel address associated with the last page in the data structure.

26. The system of claim 25, wherein the kernel addresses are generated in response to determining that the last kernel address to be generated matches the kernel address associated with the last page in the data structure.

27. An article of manufacture comprising a storage medium having stored therein instructions capable of being executed by a processor in communication with a memory to perform:

receiving a user address in a user address space and length defining a user address range referencing physical locations in a memory;

determining at least one page in the memory including the physical locations referenced by the user address range; and generating, for each determined page, one kernel address in a kernel address space to reference the determined page, wherein at least one user address and at least one kernel address reference one page in the memory.

28. The article of manufacture of claim 27, wherein determining the at least one page further comprises:

setting a specified user address to the received user address;

determining a page referenced by the specified user address;

incrementing the specified user address by a page size; and performing an additional iteration of the operations of determining the page and incrementing the specified user address if the incremented specified user address is less than or equal to the received user address plus the length.

29. The article of manufacture of claim 28, wherein determining the page referenced by the specified address comprises:

determining an entry in a page table indicated in the user address, wherein the determined page is indicated in the determined entry in the page table.

30. The article of manufacture of claim 29, wherein determining the entry in the page table comprises:

determining an entry in a directory table indicated in the user address, wherein the determined entry in the directory table references the page table.

31. The article of manufacture of claim 27, wherein generating the kernel address for one determined page further comprises:

indicating in an available entry in a kernel page table a reference to the determined page, wherein the entry in the kernel page table is indicated in the generated kernel address.

32. The article of manufacture of claim 31, wherein generating the kernel address for one determined page further comprises:

indicating in an available entry in a kernel directory table a reference to the kernel page table including the reference to the determined page, wherein the entry in the kernel directory table is indicated in the generated kernel address.

33. The article of manufacture of claim 27, wherein the instructions are capable of being executed to further perform:

applying a lock to each determined page to prevent the page from being swapped from the memory to a lower level storage while the kernel address references the page.

34. The article of manufacture of claim 27, wherein the storage medium further includes a driver and an application executed by the processor, wherein the instructions are capable of being executed by the processor to further perform:

providing a kernel space and a user space, wherein the driver executing in the kernel space receives the user address and the length from the application executing in the user space, wherein the driver determines the at least one page and generates one kernel address for each determined page;

returning to the application, by the driver, a handle identifying an association of the kernel address and user address referencing the page in the memory; and using, by the application, the handle to call the driver to perform operations with respect to the memory locations referenced by the handle.

35. The article of manufacture of claim 34, wherein the driver is executed by the processor to further perform:

receiving a request from the application with respect to the handle;

determining the kernel address identified by the handle; and executing the received request from the application with respect to the determined kernel address.

36. The article of manufacture of claim 35, wherein the request comprises a request to deregister the handle, wherein executing the received request comprises:

releasing the kernel address indicated by the handle.

37. The article of manufacture of claim 27, wherein the instructions are capable of being executed to further perform:

indicating in a data structure in the memory an association of each determined page with each kernel address referencing the determined page;

determining whether a first page in the user address range is associated with one kernel address in the data structure; and using the kernel address in the data structure associated with the first page in response to determining that the data structure indicates the kernel address for the first page, wherein generating one kernel address for each determined page following the first page further comprises generating one kernel address following the used kernel address indicated in the data structure for each page following the first page, and wherein the generated kernel addresses comprise a contiguous range of kernel addresses.

38. The article of manufacture of claim 27, wherein the instructions are capable of being executed to further perform:

indicating in a data structure an association of each determined page with each kernel address referencing the determined page;

determining whether a first page in the user address range is associated with one kernel address in the data structure;

determining a last page in the user address range in response to determining that the first page is not associated with one kernel address in the data structure and in response to their being multiple pages referenced by the user address range;

determining whether a last kernel address to be generated for the last page matches the kernel address associated with the last page in the data structure in response to determining that the last page is associated with one kernel address in the data structure; and returning an error in response to determining the last kernel address to be generated does not match the kernel address associated with the last page in the data structure.

39. The article of manufacture of claim 38, wherein the kernel addresses are generated in response to determining that the last kernel address to be generated matches the kernel address associated with the last page in the data structure.

* * * * *

UNITED STATES PATENT AND TRADEMARK OFFICE
CERTIFICATE OF CORRECTION

| | | |
|---|---|---|
| PATENT NO. | : 7,290,114 B2 | Page 1 of 1 |
| APPLICATION NO. | : 10/991717 | |
| DATED | : October 30, 2007 | |
| INVENTOR(S) | : Paul M. Stillwell, Jr. and Vikram A. Saletore | |

It is certified that error appears in the above-identified patent and that said Letters Patent is hereby corrected as shown below:

Column 8, Line 35, delete "farther" and replace with --further--

Column 8, Line 44, delete "farther" and replace with --further--

Signed and Sealed this

First Day of September, 2009

David J. Kappos
*Director of the United States Patent and Trademark Office*